(12) United States Patent
Leech et al.

(10) Patent No.: US 9,097,382 B1
(45) Date of Patent: Aug. 4, 2015

(54) DISPLAY SCREEN OVERLAY FRAME

(71) Applicants: Jesse Leech, Grovetown, GA (US);
Emeric Rokay, Wind Point, WI (US);
James R. Kerlin, Cedarburg, WI (US)

(72) Inventors: Jesse Leech, Grovetown, GA (US);
Emeric Rokay, Wind Point, WI (US);
James R. Kerlin, Cedarburg, WI (US)

(73) Assignee: Wiscraft, Inc., Milwaukee, WI (US)

( * ) Notice: Subject to any disclaimer, the term of this patent is extended or adjusted under 35 U.S.C. 154(b) by 277 days.

(21) Appl. No.: 13/845,499

(22) Filed: Mar. 18, 2013

(51) Int. Cl.
*G02B 27/00* (2006.01)
*F16M 13/02* (2006.01)
*H04N 5/65* (2006.01)
*G02B 27/01* (2006.01)
*G02B 5/02* (2006.01)

(52) U.S. Cl.
CPC ........... *F16M 13/025* (2013.01); *G02B 5/0278* (2013.01); *G02B 27/0172* (2013.01); *H04N 5/65* (2013.01)

(58) Field of Classification Search
CPC ............ G02B 27/0172; G02B 27/027; G02B 27/0176; G02B 7/00; A47G 29/08
USPC ................. 248/316.7, 229.26, 228.7, 231.81; 359/601, 608, 609, 801, 811, 818; 40/455
See application file for complete search history.

(56) References Cited

U.S. PATENT DOCUMENTS

| | | |
|---|---|---|
| 4,438,578 A | 3/1984 | Logan ............................. 40/782 |
| 4,529,268 A | 7/1985 | Brown .......................... 359/601 |
| 4,570,406 A | 2/1986 | DiFazio ....................... 52/656.9 |
| 4,577,928 A | 3/1986 | Brown ...................... 359/488.01 |
| D298,250 S | 10/1988 | Kildall ......................... D14/450 |
| 5,227,916 A | 7/1993 | Theirl et al. .................. 359/609 |
| 5,380,119 A | 1/1995 | Hadden .......................... 403/402 |
| 5,448,405 A | 9/1995 | Clausen et al. ............... 359/601 |
| D366,884 S | 2/1996 | Sloan ........................... D16/135 |
| 5,526,180 A | 6/1996 | Rausnitz ....................... 359/609 |
| 5,592,241 A | 1/1997 | Kita et al. ..................... 348/823 |
| 5,627,606 A | 5/1997 | Pember et al. ............... 348/818 |
| 5,689,371 A | 11/1997 | Butterfield .................... 359/609 |
| 5,692,333 A * | 12/1997 | McClave ........................ 40/785 |
| 5,754,259 A | 5/1998 | Nakamatsu et al. .......... 348/835 |
| 5,803,424 A * | 9/1998 | Keehn et al. .................. 248/489 |
| 5,909,315 A | 6/1999 | Keehn ........................... 359/609 |
| 5,971,548 A * | 10/1999 | Hung ............................ 359/609 |
| D421,973 S | 3/2000 | Jacobson ..................... D14/450 |
| 6,050,833 A | 4/2000 | Danzyger et al. ............... 439/92 |
| 6,151,083 A * | 11/2000 | Hung ............................ 348/818 |
| 6,393,676 B1 * | 5/2002 | Dowzall et al. ................. 24/568 |
| 6,765,550 B2 | 7/2004 | Janick et al. ..................... 345/87 |
| 7,226,176 B1 * | 6/2007 | Huang .......................... 359/609 |
| 7,495,846 B1 | 2/2009 | Kappel .......................... 359/802 |
| 2005/0094362 A1 | 5/2005 | Stephens .................. 361/679.27 |
| 2006/0198087 A1 | 9/2006 | Anderson et al. ........ 361/679.27 |

* cited by examiner

*Primary Examiner* — Todd M Epps
(74) *Attorney, Agent, or Firm* — Alfred J. Mangels

(57) ABSTRACT

A holder for holding a sheet of material in overlying relationship with a display screen. The holder conforms in shape and size with the display screen and is of generally rectangular form. The holder is in the form of a frame that includes a pair of spaced, opposed, parallel longitudinal frame members and a pair of spaced, opposed, parallel lateral frame members that define a rectangular frame. A suitable sheet material, such as a privacy filter, is carried within the frame, which includes a pair of frame mounting members that extend from the frame and engage an uppermost portion of the housing in which the display screen is housed.

20 Claims, 3 Drawing Sheets

DISPLAY SCREEN OVERLAY FRAME

BACKGROUND OF THE INVENTION

1. Field of the Invention

The present invention relates to a frame structure for holding a display screen overlay, the frame structure including mounting members for mounting the frame structure in overlying relationship with a display screen.

2. Description of the Related Art

Display screens for visually providing text and graphics that are generated by electronic devices for viewing have been provided based upon several to different display technologies. Among those technologies are cathode ray tube (CRT) display screens, liquid crystal display (LCD) panels, plasma display panels, light-emitting-diode-based (LED) panels, and organic light-emitting-diode (OLED) panels. Such display screens are found on various types of devices, such as computer display screens, television screens, DVD player display screens, and the like.

Depending upon their nature, their structure, and the locations in which they are used, some display screens exhibit undesired glare. The glare can cause headaches or can result in eye irritation over prolonged viewing times. In addition to glare, some display screens emit ultraviolet radiation that can result in eyestrain. And some display screens have reflective surfaces that reflect the light from nearby or overhead lighting fixtures. To ameliorate such potential problems, various types of overlays in sheet form have been devised to overlie the display screen to minimize the effects of glare, reflections, and ultraviolet radiation, among other features.

In addition to the effects on one's eyes of viewing electronic display screens, various forms of display screen image enhancement or image limitation are sometimes provided. For that purpose, polarizing filters and privacy filters can be utilized. Privacy filters are particularly desirable when, for example, a computer user is accessing material of a private or confidential nature that the user does not wish to be viewable by another individual who happens to be nearby, such as someone seated in an adjacent seat on an airplane, or someone passing by or standing or seated adjacent to a user's desk on which a computer display screen is visible.

There is therefore a need for a display screen frame for holding a display screen overlay, one that can be rapidly and conveniently positioned and retained over the surface of a display screen and can be quickly and conveniently removed when desired.

SUMMARY OF THE INVENTION

Briefly stated, in accordance with one aspect of the present invention, a display screen overlay holder is provided for holding a sheet in overlying relationship with a display screen. The screen overlay holder includes a rectangular frame defined by a pair of spaced, opposed, parallel longitudinal frame members and a pair of spaced, opposed, parallel lateral frame members, wherein the lateral frame members are disposed so that their longitudinal axes are perpendicular to the longitudinal axes of the longitudinal frame members. Each of the lateral frame members have angular ends that abut complementary angular ends of the longitudinal frame members when they are assembled by joining them together, to define an overlay holder frame that is bounded by the longitudinal and lateral frame members and that has 90° corners. Each of the frame members includes openings at each angular end thereof.

A corner connection member is provided at each 90° corner of the rectangular frame, each corner connection member having first and second perpendicularly disposed legs that extend into the respective end openings provided at each angular outer end of the longitudinal frame members and of the lateral frame members. The corner connection members each have first and second legs that are frictionally received in respective openings in ends of the longitudinal frame members and in ends of adjacent lateral frame members.

The display screen overlay holder includes a plurality of frame mounting is members for supporting the frame in overlying relationship with the display screen. The frame mounting members are carried on an uppermost longitudinal frame member when the frame is in overlying position relative to a display screen, and each frame mounting member includes an extension arm that extends outwardly in a rearward direction of the rectangular frame, relative to a plane defined by the overlay sheet, for resting on an upper surface of a housing that includes the display screen.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
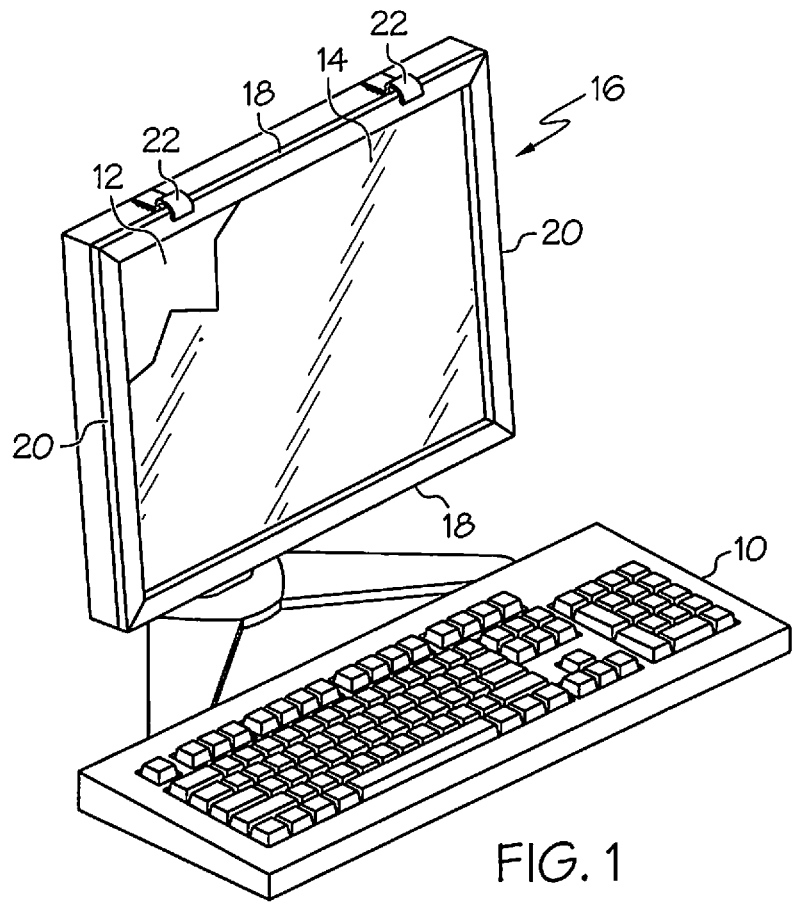
FIG. 1 is a front perspective view of a desktop computer including a display screen having an overlying sheet and overlay holder in accordance with an embodiment of the present invention.

Referring now to the drawings in more detail and initially to FIG. 1 thereof, reference numeral 10 generally designates a desktop computer keyboard and accompanying display unit that includes a display screen 12. Although described herein in the context of its use in connection with a desktop computer, the present invention is also applicable to other types of display screens, including a CRT, a LCD, an LED, and the like screens that are associated with and are parts of laptop and other portable computers, television receivers, DVD players, and the like devices that also include display screens.

A flat panel 14 in sheet form overlies display screen 12 and is held within a rectangular frame 16 that substantially coincides in overall size with that of the user-facing surface of the housing in which display screen 12 is carried. Frame 16 is defined by a pair of spaced, parallel, longitudinally extending, linear frame members 18, and a pair of spaced, parallel, laterally extending, linear frame members 20. Frame members 18 and 20 are connected together at their respective ends and are disposed in perpendicular relationship to define a rectangular frame that includes and carries panel 14, which overlies the viewing surface of display screen 12. Panel 14 can be a glare filter, a non-reflective transparent panel, an ultraviolet-light-blocking panel, a privacy panel that limits viewing angles at which the content displayed on display screen 12 can be visually accessed, or another type of functional transparent panel to improve the viewing experience of persons viewing display screen 12. Frame members 18, 20 can be extrusions of polymeric material, such as unplasticized rigid polyvinylchloride (rigid PVC), polystyrene, or similar rigid or semi-rigid materials.

Figure 2:
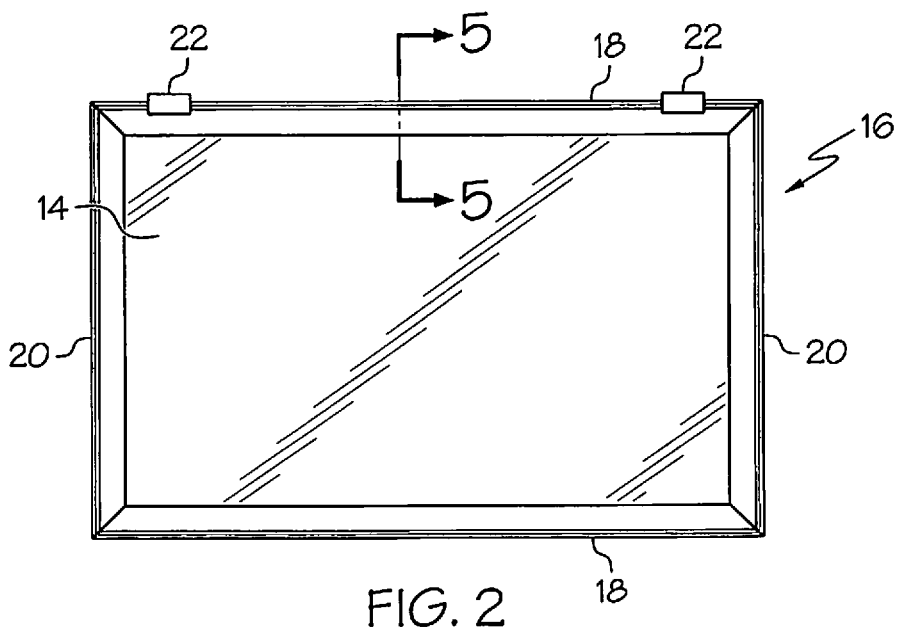
FIG. 2 is a front view of the frame shown in FIG. 1 including mounting members that support the frame over the display screen.

FIG. 2 shows a front view of frame 16, in which the longitudinal frame members 18 and the lateral frame members 20 are connected in abutting relationship at their respective outer ends to form rectangular frame 16. The ends of frame members 18, 20 are each angularly biased in complementary relationship, so that the ends of adjacent angularly disposed frame members can tightly abut each other without a significant clearance therebetween. The angular bias can be a 45° angle, or it can be other angles, such as 30° on one frame member end and 60° at the contacting frame member end, or any other different angles so long as the two angles at the contacting ends of the respective frame members are complementary angles that together total 90°. Also carried by frame 16 are a plurality of frame mounting members 22, two of which are shown in FIG. 2. Frame mounting members 22 each engage with the upper longitudinal frame member 18, and they also rest on an upper surface of the housing in which display screen 12 is positioned, to support frame 16 in overlying position relative to the viewing surface of display screen 12.

Figure 3:
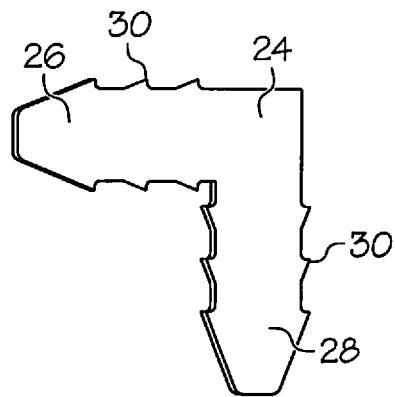
FIG. 3 is a perspective view of one form of corner connector for connecting adjacent frame member components perpendicular to adjacent frame members.

The abutting frame members 18, 20 at the corners of frame 16 are securely held together by corner connection members 24 that are received in each abutting end of the respective frame members. One form of connection members 24 is shown in FIG. 3. Corner connection members 24 can be of planar form, or they can be of rounded form in cross section, and they include first 26 and second 28 perpendicularly arranged arms. Each of arms 26, 28 includes a plurality of laterally-outwardly-extending gripping edges 30 that extend outwardly beyond the outer longitudinal edges of each of the respective arms and that include sharply pointed outer ends. Gripping edges 30 can be angular, outwardly diverging elements, as shown in FIG. 3. Each of arms 26, 28 can include one or a plurality of gripping edges 30 on each longitudinally extending edge of the arm.

Figure 4:
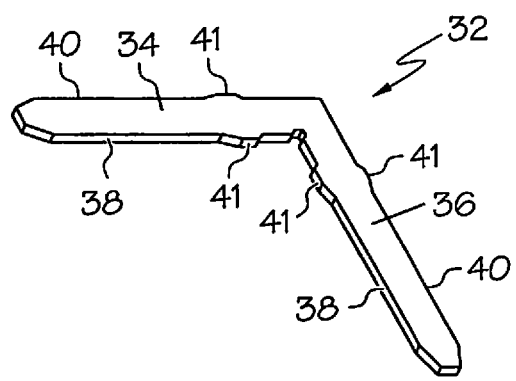
FIG. 4 is a perspective view of another form of corner connector.

As an alternative to the connection member structure shown in FIG. 3, the connection members can take the form shown in FIG. 4. As shown, an alternative form of connection member 32 includes respective perpendicularly arranged arms 34, 36, each arm having respective linear inner edges 38 and linear outer edges 40 that are parallel to each other, at least one of which outer edges of each of arms 34, 36 includes an outwardly-extending projection 41.

FIG. 4 shows a connection member embodiment in which each of arms 34 and 36 includes a single outward projection 41 at each inner edge 38 and each outer edge 40

Each of connection members 24 and 32 is configured to be tightly received in correspondingly shaped openings that are present at respective outer longitudinal ends of each of the adjacent frame members 18, 20.

Figure 5:
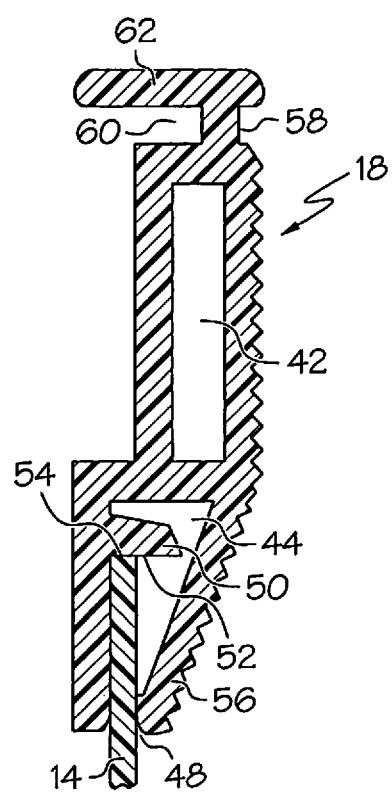
FIG. 5 is a cross-sectional view of a longitudinal frame member taken along the line 5-5 of FIG. 2.

FIG. 5 shows a cross-sectional view taken through a typical frame member. Frame member 18 includes a first inner channel that can be of rectangular form and that terminates in a rectangular end opening 42 at each outer longitudinal end of the frame member. Rectangular openings 42 at the outer ends of the frame members each have a front-to-back width and a top-to-bottom depth that are substantially equal to the corresponding cross-sectional width and thickness of an arm 26, 28 of corner connection member 24. The corner connection member arms 26, 28 are pressed into the rectangular openings at the ends of the frame members 18, 20, so that the outwardly-extending gripping edges 30 provide an interference fit within the first inner channel inward of openings 42 of each of the frame members to be joined, to connect the respective frame members together at corners of the frame in perpendicular relationship, and, by virtue of the interference fit of the corner connection members 24 within the respective end openings 42, to securely hold the connected ends of frame members 18, 20 together to prevent undesired separation. To maintain a secure connection between connection members 24 and frame members 18, 20, the connection members are formed from a material, such as metal, that has a hardness that is greater than the hardness of the frame member material, so that gripping edges 30 dig into and engage the surfaces inside of end openings 42 to securely and substantially-non-removably engage corner connection members 24 with the respective frame members 18, 20. The width dimension between the outermost gripping edges 30 on each longitudinal edge of arms 26, 28, is preferably larger than the top-to-bottom dimension of rectangular openings 42, as viewed in FIG. 5, to provide the desired interference fit between corner connection members 24 and frame members 18 and 20 that are to be connected together. In that regard, connection members 24 can be made from metal, and frame members 18, 20 can be made from a softer, polymeric material, so that the connection members can be inserted into rectangular end openings 42 with the desired interference fit, wherein a degree of deflection of the upper and lower surfaces at rectangular end openings 42 takes place to provide the desired secure connection between the connection members and the frame members.

Frame connection members 32 shown in FIG. 4 are structurally similar to frame connection members 24 shown in FIG. 3. The principal difference between those connection member embodiments resides in the form of the outwardly extending enlargements, or projections, that extend along the longitudinal outer edges of the respective arms of the connection members. Instead of the pointed outer ends of griping edges 30 on connection member 24, the FIG. 4 connection member embodiment includes on each of the longitudinal edges of its arms 34, 36 outwardly-extending projections or tabs that have their outermost edge surfaces substantially parallel to each other and spaced laterally from each other at a slightly greater distance than the top-to-bottom dimension of rectangular openings 42, again in order to provide an interference fit between connection members 32 and the end openings 42 of frame members 18, 20.

FIG. 5 also shows a second longitudinal inner channel 44, of substantially triangular cross-sectional form. Inner channel 44 extends longitudinally within each of the frame members 18, 20 adjacent to the first inner channel that terminates at end openings 42, and is disposed at inwardly facing edges of the frame members when they are assembled to form a rectangular frame. Second inner channel 44 includes a linearly extending rectangular opening 48 that extends along the entire lengths of frame members 18, 20 and faces in an inward direction of the frame members when they are assembled to form a completed frame 16. Opening 48 has a width that is slightly smaller than the thickness of overlying panel 14, in order to receive and to securely grip and hold the panel within opening 48. Within second inner channel 44 and inwardly of opening 48 is a longitudinally extending stop wall 50 that provides a stop surface 52, against which an outer edge 54 of panel 14 within second inner channel 44 can be in abutting relationship when the panel is inserted into second inner channel 44. In that regard, an outer wall 56 of second inner channel 44 can deflect outwardly during assembly of a panel 14 into frame members 18, 20, to facilitate insertion of the panel through opening 48 and into second inner channel 44.

Figure 6:
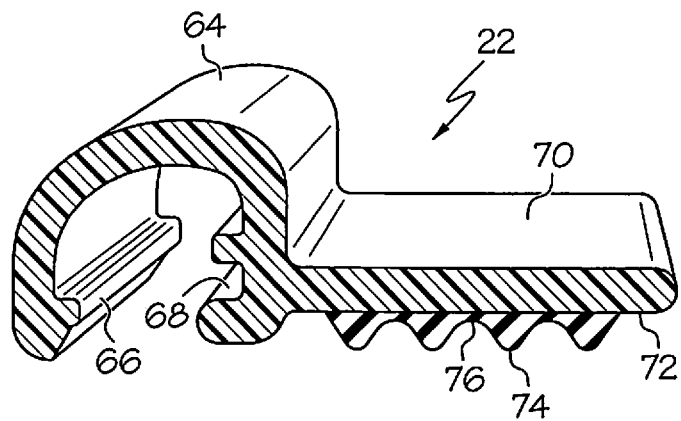
FIG. 6 is a perspective view of a frame mounting member for engaging a longitudinal frame member to facilitate positioning and holding the assembled rectangular frame in overlying position relative to the display screen.
Figure 7:
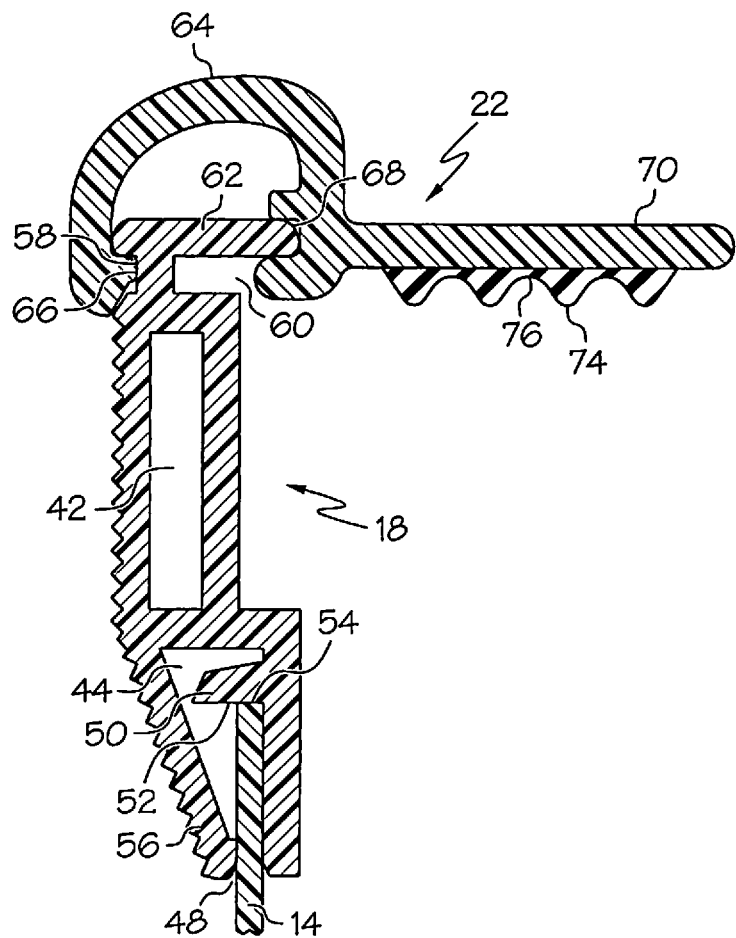
FIG. 7 is a fragmentary perspective cross-sectional view of a longitudinal frame member with an attached frame-mounting member.

At an outer surface region opposite to opening 48 of each of frame members 18, 20, a pair of oppositely facing, longitudinally extending grooves 58, 60 are provided that are coaxial with each other. Longitudinal grooves 58, 60 have respective oppositely-outwardly-facing openings with a top-to-bottom spacing, as seen in FIG. 5, which is defined by the distance between an inwardly facing surface of top wall 62 that is spaced from first inner channel 42, and an inner wall that defines a transversely extending end of first inner channel 42. Grooves 58, 60 serve to receive a frame mounting member 22 having the form shown in FIG. 6, to engage the uppermost edge of the upper longitudinal frame member 18 as shown in FIGS. 1, 2, and 7. Frame mounting member 22 includes an arched end region 64, the inner arched surface of which includes an inwardly facing ridge 66 on one side, and the opposite side of which includes an inwardly facing groove 68. As shown in FIG. 7, ridge 66 of frame mounting member 22 engages the outer groove 58 in longitudinal member 18, and groove 68 of frame mounting member 22 engages an inner edge of wall 62. Extending from arched region 64 in a direction opposite to groove 68 in frame mounting member 22 is an extension arm 70 on the downwardly-facing surface 72 of which are provided a series of undulations that define a plurality of ridges 74 and intervening grooves 76.

When frame 16 is in assembled form, at least two frame-mounting members 22 are connected in spaced relationship along the upper longitudinal frame member 18 that serves as the upper longitudinal member of the assembled frame. Frame 16 with an inner panel 14 can then be placed to overlie a display screen 12 as shown in FIG. 1. Extension arms 70 of frame mounting members 22 each rest against the upper longitudinal edge of the display screen housing. Ridges 74 and grooves 76 on frame mounting members 22 serve to engage the upper edge surface of the display screen housing, regardless of the form of that upper surface, and to hold the frame over the display screen. The lower longitudinal frame member 18 can rest against the lower longitudinal wall of the housing surrounding display screen 12.

Frame mounting members 22 can be formed by extrusion of a relatively rigid material, such a rigid PVC, which can then be cut to provide a frame-mounting member having the desired width, such as about ½ in. The ridged 74 and grooved 76 portions on the underside of extension arm 70 are preferably formed from a softer, more flexible material, such as plasticized PVC, which can be coextruded with the rigid PVC to provide a bonded connection therebetween. The softer nature of the material from which the plasticized PVC ridges and grooves are formed on the underside of extension arm 70 allow a frictional engagement of the outer end surfaces of ridges 74 with a flat surface of the display screen housing upper border. If that upper border includes one or more longitudinally extending projections, one or more grooves 76 can receive such projections to hold assembled frame 16 and restrain it from outward slippage away from the upper border of the display screen housing.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A display screen overlay holder for holding a sheet in overlying relationship with a display screen, said screen overlay holder comprising:
   a. a rectangular frame defined by a pair of spaced, opposed, parallel longitudinal frame members and a pair of spaced, opposed, parallel lateral frame members, wherein the lateral frame members are disposed perpendicular to the longitudinal frame members and have angular outer ends that abut angular outer ends of the longitudinal frame members to form frame corners that are defined by the angular outer ends of the longitudinal and lateral frame members and that are 90° corners, and wherein each of which angular outer ends of the frame members include end openings;
   b. a corner connection member at each 90° corner of the frame, each corner connection member having first and second perpendicularly disposed legs that extend into the end openings provided at each angular outer end of the longitudinal frame members and of the lateral frame members, wherein the first and second legs of the corner connection members are frictionally received in respective ones of the end openings of the longitudinal frame members and respective ones of the end openings of adjacent lateral frame members; and
   c. a plurality of frame mounting members for supporting the frame in overlying relationship with the display screen, wherein the frame mounting members are carried on a first longitudinal frame member that is uppermost when the frame is in overlying position relative to the display screen, and each frame mounting member includes a body with a connection region for connecting the frame mounting members to the first longitudinal frame member, and an extension arm that extends outwardly relative to a plane defined by the screen overlay for resting on an upper surface of a housing that includes the display screen.

2. A display screen overlay holder in accordance with claim 1, wherein longitudinal ends of the longitudinal frame members and longitudinal ends of the lateral frame members have angled outer ends that are complementary angles to form the 90° corners when the frame is in assembled form.

3. A display screen overlay holder in accordance with claim 2, wherein the angled outer ends of each of the frame members each are inclined at a 45° angle relative to a longitudinal direction of the respective frame members.

4. A display screen overlay holder in accordance with claim 1, wherein the frame members are formed from rigid PVC material.

5. A display screen overlay holder in accordance with claim 1, wherein the first longitudinal frame member includes opposed, outwardly facing grooves adjacent an outermost longitudinally extending outer surface for receiving a frame-mounting member.

6. A display screen overlay holder in accordance with claim 1, wherein the longitudinal and lateral frame members each include an inwardly-directed, longitudinally-extending opening for receiving and holding a sheet material when the frame members are assembled by joined respective outer ends of the frame members to form a rectangular frame.

7. A display screen overlay holder in accordance with claim 6, wherein the inwardly directed openings of the longitudinal and the lateral frame members include an inner stop surface for contacting an outer edge of the sheet material.

8. A display screen overlay holder in accordance with claim 7, wherein the inner stop surfaces are defined by a respective stop wall that extends laterally into the inwardly directed opening.

9. A display screen overlay holder in accordance with claim 1, wherein the corner connection members include laterally outwardly extending projections on each longitudinally extending edge of the legs thereof.

10. A display screen overlay holder in accordance with claim 9, wherein the projections include outwardly pointed gripping edges.

11. A display screen overlay holder in accordance with claim 9, wherein the legs of the corner connection members include laterally opposed projections.

12. A display screen overlay holder in accordance with claim 9, wherein the projections on opposite sides of the connection member legs have outermost ends that are spaced a distance that is greater than a corresponding dimension of the end openings of the frame members.

13. A display screen overlay holder in accordance with claim 1, wherein the end openings in each of the longitudinal frame members and the lateral frame members are rectangular, and the legs of the corner connection members are of planar form.

14. A display screen overlay holder in accordance with claim 1, wherein the connection regions of the frame-mounting members are arched regions adapted to overlie an upper outer surface of the first longitudinal frame member.

15. A display screen overlay holder in accordance with claim 14, wherein the arched region includes an inner surface that faces an upper outer surface of the first longitudinal frame member and has an inwardly extending ridge and an opposed inwardly opening groove, wherein the ridge and the groove of the inner surface of the arched region each engage the first longitudinal frame member.

16. A display screen overlay holder in accordance with claim 14, wherein the arched region and the extension arm of the frame-mounting members are formed from a rigid polymeric material.

17. A display screen overlay holder in accordance with claim 16, wherein the rigid polymeric material is rigid PVC.

18. A display screen overlay holder in accordance with claim 1, wherein the frame mounting member extension arm includes a plurality of alternating ridges and intervening grooves for contacting an uppermost surface of a display screen housing.

19. A display screen overlay holder in accordance with claim 18, wherein the extension arm includes a surface for facing and overlying a display screen housing and includes a plurality of alternating ridges and intervening grooves that are formed from a resilient material having a surface hardness that is less than that of an outwardly facing upper portion of the extension arm.

20. A display screen overlay holder in accordance with claim 19, wherein the resilient material is plasticized PVC and the upper portion of the extension arm is formed from rigid PVC.

* * * * *